US005863197A

United States Patent [19]

Boy et al.

[11] Patent Number: 5,863,197

[45] Date of Patent: Jan. 26, 1999

[54] SOLID FLIGHT CONVEYING SCREW FOR FURNACE

[75] Inventors: William A. Boy, Ellwood City; David M. Hoffman, Harmony, both of Pa.

[73] Assignee: The International Metals Reclamation Company, Inc., Ellwood City, Pa.

[21] Appl. No.: 846,087

[22] Filed: Apr. 25, 1997

[51] Int. Cl.[6] .............................. F27D 3/08; B65G 33/26

[52] U.S. Cl. .............................. 432/236; 198/676; 414/149; 414/197

[58] Field of Search .............................. 432/138, 139, 432/233, 234, 235, 236, 246; 198/676, 677; 414/149, 158, 190, 197

[56] References Cited

U.S. PATENT DOCUMENTS

| | | | |
|---|---|---|---|
| 3,443,931 | 5/1969 | Beggs et al. | 75/33 |
| 3,738,420 | 6/1973 | Poux et al. | 165/310 |
| 3,764,062 | 10/1973 | Brautigam | 233/7 |
| 3,800,865 | 4/1974 | Onarheim et al. | 165/92 |
| 3,977,515 | 8/1976 | Lewoczko | 198/213 |
| 4,466,533 | 8/1984 | Shwayder | 198/676 |
| 4,505,222 | 3/1985 | Christian | 432/139 |
| 4,636,127 | 1/1987 | Olano et al. | 414/158 |
| 5,529,170 | 6/1996 | Schwartz et al. | 198/676 |
| 5,673,618 | 10/1997 | Little | 198/676 |

FOREIGN PATENT DOCUMENTS

| | | |
|---|---|---|
| 3610490 | 4/1985 | Denmark . |
| 649096 | 4/1985 | Switzerland . |
| 1358191 | 7/1966 | United Kingdom . |

*Primary Examiner*—Henry A. Bennett
*Assistant Examiner*—Gregory Wilson
*Attorney, Agent, or Firm*—Edward A. Steen

[57] ABSTRACT

A fluid cooled conveying screw adapted for rotary hearth furnaces. A plurality of solid alternating single and double flights are affixed to an outer barrel. The single flights are at least partially cladded to withstand the rigors of the furnace. The double flights extend partially down the barrel.

10 Claims, 3 Drawing Sheets

SOLID FLIGHT CONVEYING SCREW FOR FURNACE

TECHNICAL FIELD

The instant invention relates to furnace design in general and, more particularly, to a fluid cooled solid flight discharge screw adapted for use in rotary hearth furnaces.

BACKGROUND ART

Assignee employs a rotary hearth furnace (RHF) to recover and recycle valuable nickel, chromium and iron from steel plant wastes such as flue dust, sludge, turnings, etc. In a separate process, it also directly reduces iron oxide in the RHF.

In assignee's operations, metallic plant wastes are first pelletized with coal and then partially reduced in the RHF. The entrained carbon (from the coal) reacts with oxygen in the RHF to produce carbon monoxide which in turn reduces the nickel and iron. The resultant partially sintered pellets are then subsequently treated in an electric arc smelting furnace wherein the chromium is reduced. Ultimately, a rough intermediate 18–8 stainless steel pig is produced. The pig is recycled to the stainless steel industry for reintroduction into their furnaces as ancillary feedstock.

Briefly, an RHF is a continuous reheating furnace generally having a circular inner wall circumscribed by a spaced circular outer wall. The circular void formed therebetween includes an annular rotating hearth. In order to retain and reflect the heat generated within the furnace, the walls are relatively low so as to enable the roof to be close to the hearth. Burners may be installed in the inner and outer walls and in the roof.

Material is usually loaded onto the rotating hearth by dropping it with a conveyor or chute. After the material is carried on the hearth, it is usually removed by a discharge or conveying screw. Due to high temperatures (1300°–2300° F. [704°–1260° C.]), the screw is water cooled. See U.S. Pat. No. 3,443,931. Gases are permitted to vent through a flue located in the roof.

A conveying or discharge screw typically consists of a central shaft with a series of helical flights welded thereto. A cooling fluid is passed through the screw. U.S. Pat. No. 4,636,127 (assignee's current design) discloses a discharge screw having water cooled hollow flights.

The discharge screw conveys the reduced pellets from the hearth bed down a refractory chute and into containers. The discharge screw extends across the width of the donut shaped hearth and is connected to a motor for rotation.

The screw is mounted on a trunnion to allow for height adjustment above the hearth. In order to remove the screw from the furnace, the screw must be first disconnected from its moorings and couplings and then upwardly removed through the roof; a difficult job.

Due to the corrosive nature of the gases and materials present within the RHF, coupled with the high temperatures therein, the discharge screw is subject to frequent failure. The screw barrel and the hollow flights eventually deteriorate. Corrosion and erosion caused by high temperatures, tough particles and bad actors (sodium, sulfides, chlorides, fluorides) within the RHF inexorably chew up the screws and render them useless after about five months.

In addition, the spaces between the flights accumulate fluffy fines that tend to cake together. The fines act as a sponge which serves to collect and concentrate the corrosive gases present within the furnace.

The barrel of the discharge screw originally was fabricated from a butt-welded carbon steel tube. Service life of the tube declined as levels of contaminants (in particular chlorine) in the furnace environment increased. The surface of the barrel would corrode away until water leaks developed necessitating replacement of the entire discharge screw. Service life of the plain carbon steel barrel ranged from four to ten months.

Similar surface corrosion was also observed on the surface of the plain carbon steel discharge screw trunnions that also operate within the furnace atmosphere. As a result, each time a discharge screw was removed from service these trunnions were extensively remetallized to bring their wall thickness back to the original diameter.

Currently, flights are cast from HH alloy (20% nickel, 20% chromium) and are weld overlaid with Inconel® alloy 72 (55% nickel, 45% chromium) on both surfaces of the flight. (Inconel is a trademark of the Inco family of companies). The purpose of the overlay is to inhibit corrosion of the surface of the flight where it historically corrodes in an "hour glass" pattern along the thickness of the flight. Flights are welded to the barrel using Inconel alloy 82 filler metal. No problems have been observed in the weld area so Inconel alloy 82 continues to be the alloy of choice for welding. This design has resulted in an average service life of 6½ months. Even with the overlay, the tip of the flight ultimately breaks off at a location approximately one to two inches (2.54–5.08 cm) up from where the flight is welded to the surface of the barrel.

As can be appreciated, frequent screw replacement necessitates frequent downtime, high maintenance and labor costs, and inefficient use of the furnace which in turn leads to higher unit costs. Clearly a longer lasting screw design is necessary.

SUMMARY OF THE INVENTION

Accordingly, there is provided a discharge screw adapted to withstand the rigors of the RHF.

The screw includes a central barrel and a plurality of solid helical flights affixed thereon. Coolant flows through the barrel in a serpentine flow pattern. The flights are arranged so that alternate flights are double flights. The single sets of flights are clad with corrosion resistant materials. The double flights and the cladding on the single flights extend partially down the barrel of the discharge screw.

PREFERRED MODE FOR CARRYING OUT THE INVENTION

Figure 1:
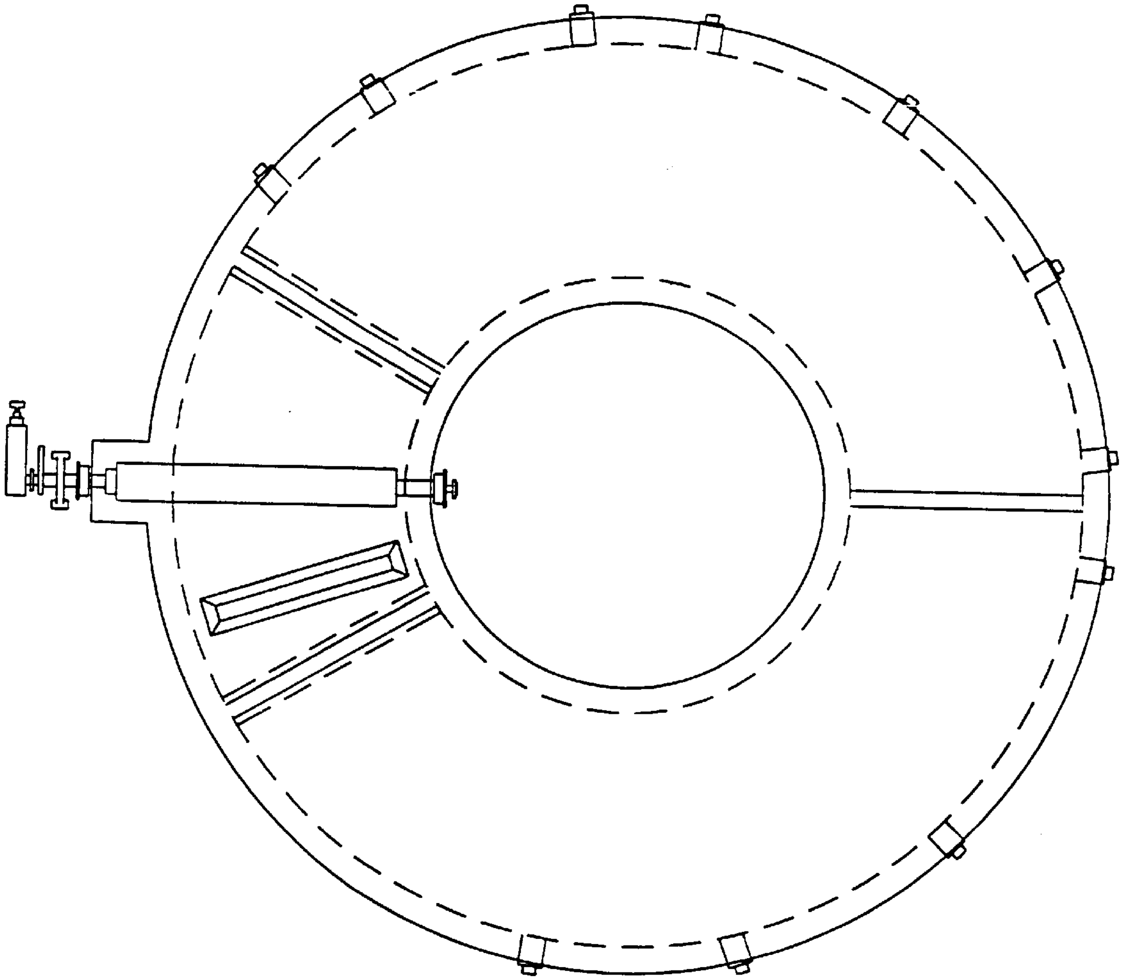
FIG. 1 is a plain view of a rotary hearth furnace.

Referring to FIG. 1, there is shown a greatly simplified view of a rotary hearth furnace (RHF) 10. The RHF 10 includes an insulated outer annular wall 12 and an insulated inner annular wall 14. A hearth 16 rotates within the RHF 10 in the directions shown by arrow 18. A plurality of burners

20 are situated about the RHF 10. Optional curtains 22 may divide the RHF 10 into distinct sections. Material is introduced onto the hearth 16 by a feeder 24 mounted in the roof (not shown) of the RHF 10.

After material processing is complete; that is, after almost one complete revolution of the hearth 16, the treated material is removed by discharge screw 26 and is deposited into a bin (not shown) for subsequent treatment. The discharge screw 26 is driven by motor and mechanical linkage 28. Water is supplied to the screw 26 through coupling 30 and is exhausted through the linkage 28.

FIGS. 2–5 depict the screw 26 in greater detail.

In contrast to U.S. Pat. No 4,634,127, the flights 32 are solid which permits a more robust construction. Moreover, selected flights 32 are doubled and cladded to reduce corrosion and erosion.

Figure 5:
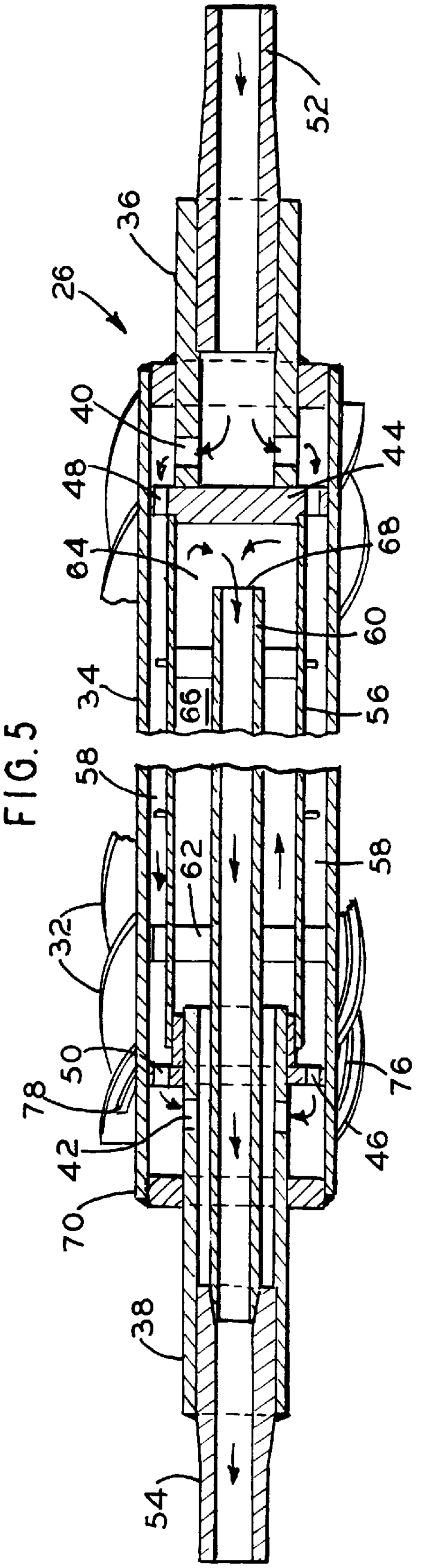
FIG. 5 is a cross sectional view of an embodiment of the invention.

Turning first to FIG. 5 the screw 26 includes outer barrel 34 affixed to proximal pipe 36 and distal pipe 38. Each pipe includes a plurality of perforations 40 and 42 disposed near bulkheads 44 and 46. Each bulkhead includes a plurality of radially disposed apertures 48 and 50.

The proximal pipe 36 and the distal pipe 38 are affixed to connecting tubes 52 and 54 respectively. The connecting tubes 52 and 54 connect the discharge screw 26 to the RHF 10 and permit entry and egress of the cooling water as shown by the directional arrows.

An inner barrel 56 defines a first annular passage 58 with the outer barrel 34.

A central conduit 60 is disposed within the inner barrel 56 and spaced thereapart by a plurality of internal spacers 62. The central conduit 60 is registered to the connecting tube 54 and extends into the distal pipe 38. The proximal end 68 of the central conduit 60 is spaced away from the bulkhead 44 so as to form a coolant turning void 64.

A second annular passage 66 is formed between the inner barrel 56 and the central conduit 60.

In contrast to the hollow flight design as taught in U.S. Pat. No. 4,636,127, the instant flights 32 are solid. From operating experience, it was determined that hollow flights are prone to excess corrosion and erosion difficulties. The solid flights 32 are less prone to the debilitating effects of the RHF 10. Moreover, since the solid flights 32 permit a more robust construction of the screw 26, as compared to a hollow flight design, there is a decreased likelihood of the cooling water breaching the outer barrel 34. Hollow flights have less strength than solid flights and pose potential water leak sites. Since water physically does nut pass through the solid flights 32, the instant screw 26 carries with it a lesser probability of failure and a water induced furnace explosion.

Figure 2:
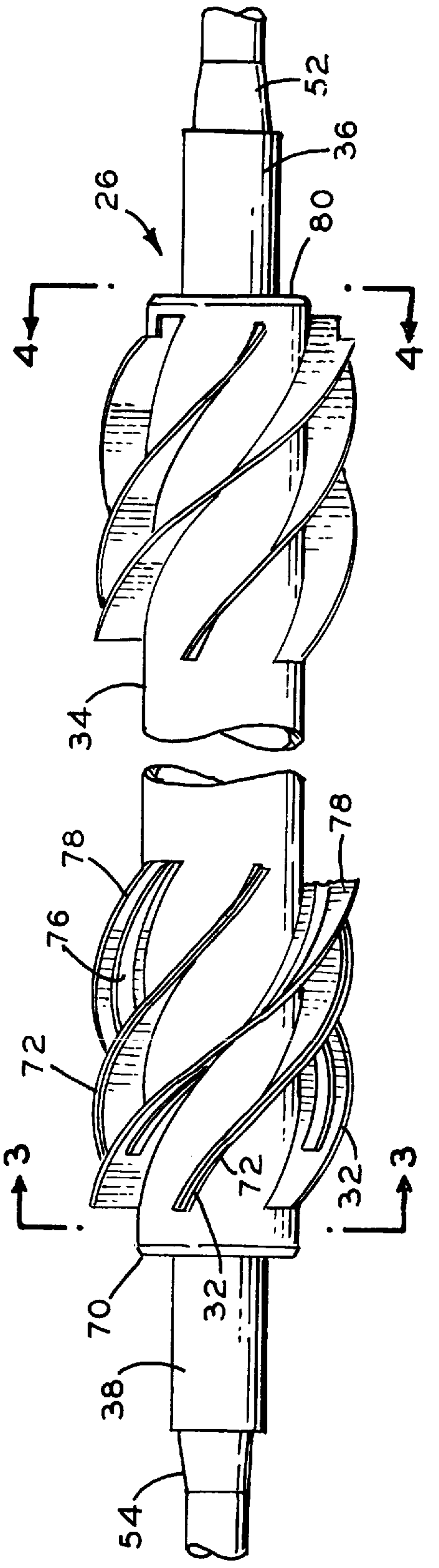
FIG. 2 is a side elevation of an embodiment of the invention.
Figure 3:
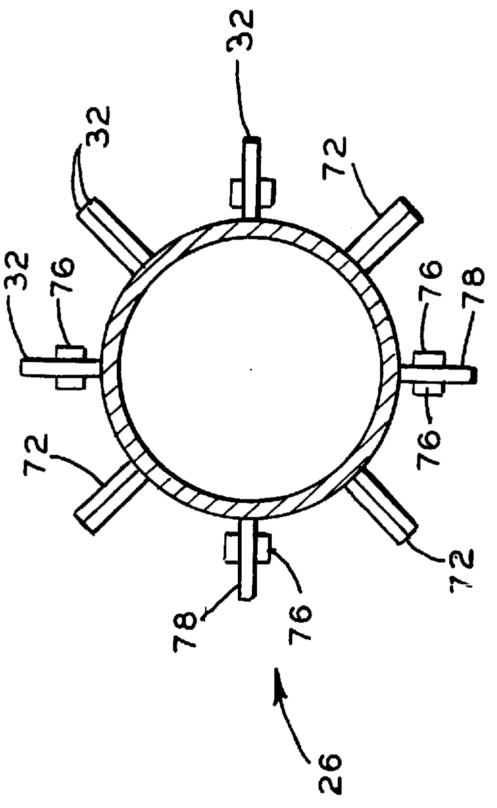
FIG. 3 is a cross sectional view taken along line 3—3 in FIG. 2.
Figure 4:
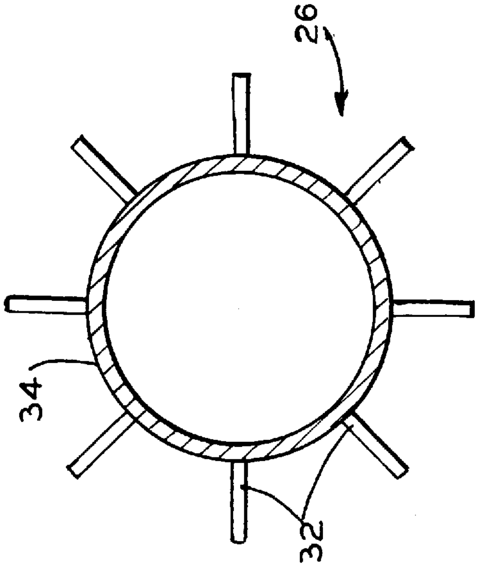
FIG. 4 is a cross section view taken along line 4—4 in FIG. 2.
Figure 1:
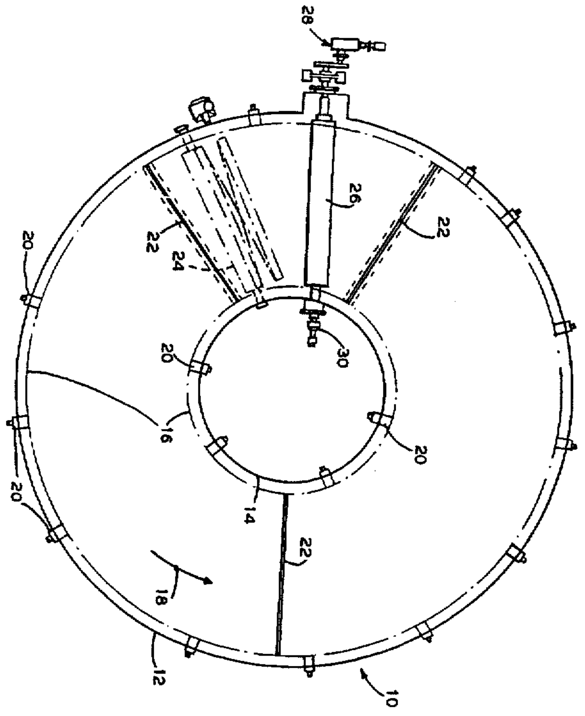

FIGS. 2–4 provide detailed views of the flights 32. In particular, where the screw 26 experience high wear conditions, the screw 26 incorporates double thickness alternate rows of solid flights 32.

Towards the distal end 70 of the outer barrel 34, alternate solid flights 32 are double flighted 72. Each double flight 72 consists of two adjacent single flights 32 welded together. A cladding ribbon 76 runs along both sides of the single flight 78. See FIG. 3.

The double flights 72 extend partially down the outer barrel 34 towards the proximal end 80 of the outer barrel 34 whereupon they revert to single flights. Similarly, proceeding down the barrel 34 towards the proximal end 80, the cladding ribbons 76 in the single flights 78 may be terminated since the wear patterns tend to be not as severe.

As opposed to the previous design, the outer barrel 34 is preferably constructed from a butt-welded type 321 austenitic stainless steel alloy tube. Approximate dimensions of the tube are 17 inch (43.2 cm) outside diameter, 0.5 inch (1.27 cm) wall, and 16 feet, 1½ inches (4.9 cm) long. Type 321 stainless is an austenitic, 17% chromium, 9% nickel stainless steel containing titanium to stabilize the carbon. The grade is suggested for use in certain corrosive environments for parts fabricated by welding and cannot be subsequently annealed. It is also suggested for parts exposed to between 800°–1600° F. (425°–900° C.) end certain corrosive environments.

The outer barrel 34 made from 321 stainless permits multiple reuse of the barrel 34 by the simple expedient of removing worn flights 32 and welding new flights 32 onto the surface of the outer barrel 34.

As stated previously HH chromium nickel alloy on the flights 32 eroded. As a result Supertherm® alloy (31% nickel, 26% chromium, 15% cobalt, 5% tungsten) was substituted for the HH. This high temperature alloy (2300° F. [1260° C.]) is resistant to carburization oxidation and corrosion.

Prototype discharge screws fabricated with Superthenn alloy flights performed up to twelve months in service. This service life is generally two to four months longer than previous discharge screws equipped with HH alloy flights.

A disadvantage was found with Supertherm alloy flights; one area of the screw approximately 20-inches (50.8 cm) in from the discharge (distal) end 70 of the screw and approximately two feet (0.61 m) wide exhibited chipping and breakage of the tips of the Supertherm alloy flights. This condition was not a contributing factor leading to previous discharge screw replacement.

It was theorized that the cause of this problem related to the fact that the Supertherm alloy does not exhibit the same level of high temperature toughness as the HH alloy. Therefore, because of lower toughness this alloy is more prone to tip breakage when contacting large chunks of hard materials such as brick or dross. In an effort to minimize this problem it was decided that the alloy used in each row of flights in this problem area would be alternated between HH alloy and Supertherm alloy. This would then provide rows of flights that exhibit good high temperature toughness alternating with rows of flights exhibiting good high temperature corrosion resistance. Along with this modification one further alteration was made; to further strengthen the Supertherm flights consideration was given to increasing the thickness of the flight. One concern with this change was that the increased mass of a thicker flight would result in higher operating temperatures of the flight. Higher operating temperatures would then likely result in poorer performance. To demonstrate this alteration without incurring the high cost for changing the thickness of the flights (pattern charges, dies modifications, etc.) or risk, it was decided that one row of flights in the high wear area would consists of a row of two flights welded together.

The prototype discharge screw with the above modifications was placed in service for about a year. This service life represents the longest service life (by two months) of any discharge screw used in the last six years and is most likely the longest service life ever experienced with any screw. Examination of this discharge screw indicated no significant problems with approximately two inches (5.08 cm) of flight height left in the high wear area. It was anticipated that this discharge screw would have performed satisfactorily for at least another two to four months.

It is believed that existing furnace conditions which this discharge screw was exposed to also may have assisted in prolonging the service life of this discharge screw. During the last several months of tests and operation this screw operated in a more oxidizing atmosphere than the normal reducing atmosphere. This atmosphere was a result of air infiltration through worn out seals and holes in the wall of the furnace. In a high temperature reducing atmosphere heat resistant alloys are more prone to corrosion because the chromium oxide that protects the surface is removed by reduction reactions. In a reducing atmosphere these alloys are also more susceptible to carburization attack that results in the formations of internal carbides that in turn cause the alloy to suffer embrittlement as well as other mechanical property degradation.

As a result of the operating experiences with the older HH flights screws and the prototype single Supertherm alloy screw, it was determined that by alternating cladded single HH flights 78 with double Supertherm flights 72 the resulting discharge screw 26 would withstand the intense RHIF 10 environment.

Moreover, due to the pellet flow patterns engendered by the screw 26, the distal end 70 of the barrel 36 experiences heavier wear than the proximal end 80. As the pellets are conveyed to the outer region of the hearth 16, they tend to accumulate there creating more opportunities for screw 26 erosion. It is preferred to extend the cladding ribbons 76 on the single HH alloy flights 78 approximately 25% of the length of the outer barrel 34. As a non-limiting example for the instant discharge screw 26, this amounts to about 3.5–4 feet (1.1–1.2 m).

Because making the double flights 72 hollow for cooling purposes would be expensive, all of the flights 32 were made solid with water coursing below their roots in the annular passage 58. By providing a sufficient flow and head, the discharge screw 26 would be cooled to prevent damage.

For efficiency, a serpentine water flow as shown by the arrow in FIG. 5 is adequate to maintain cooling. Water is introduced through the connecting tube 52 where it flows through perforations 40 into the annular space 58. The flowing water, in indirect contact with the flights 32 and in direct contact with the outer barrel 34, eventually reaches the perforations 42 where it is reversed towards the bulkhead 44. Upon reaching the coolant turning void 64, the water is rerouted again 180° through the central conduit 60 and then out through the connecting tube 54.

The instant discharge screw 26 design is expected to double the duty cycle of the screw from about 6 months to about 12 months before removal. Moreover, deteriorated flights 32 may be removed and replaced with new flights on the same barrel 34 by the sample expedient of welding the new partially cladded flights-whether single or double-on the existing barrel 34. While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follow:

1. A fluid cooled discharge screw adapted for use in a furnace, the screw comprising a proximal end, a distal end, and an outer barrel disposed therebetween, a plurality of spaced continuous single solid flights affixed to the exterior of the outer barrel, a plurality of spaced continuous double solid flights affixed to the exterior of the outer barrel and extending at least partially towards the proximal end of the discharge screw, internal routing means disposed within the outer barrel for directing a fluid coolant to change longitudinal direction within the discharge screw at least twice prior to exiting the discharge screw, a first annular longitudinal internal passage disposed adjacent to the outer barrel and in indirect cooling connection with the solid flights, and cladding at least partially extending along the sides of the single solid flights.

2. The discharge screw according to claim 1 wherein the cladding on the single solid flights commences at the distal end of the discharge screw and extends at least partially towards the proximal end of the discharge screw.

3. The discharge screw according to claim 1 wherein the single solid flights and the double solid flights are constructed from two distinct alloys.

4. The discharge screw according to claim 1 wherein the single solid flights and the double solid flights alternate with one another.

5. The discharge screw according to claim 1 wherein only single solid flights arc affixed to the proximal end of the discharge screw.

6. The discharge screw according to claim 1 wherein the double solid flights extend about 25% of the length of the outer barrel from the distal end of the discharge screw.

7. The discharge screw according to claim 2 wherein the cladding on the single solid flights extend about 25% of the length of the outer barrel from the distal end of the discharge screw.

8. The discharge screw according to claim 1 including means for introducing and removing the fluid coolant therein and thereout.

9. The discharge screw according to claim 1 wherein the first annular longitudinal internal passage extends substantially along the entire length of the outer barrel.

10. The discharge screw according to claim 9 including the outer barrel, a proximal pipe, and a distal pipe affixed to the outer barrel, an inner barrel spacedly disposed within the outer barrel and forming the first annular longitudinal internal passage therebetween, the proximal pipe including first apertures communicating with the first annular longitudinal internal passage, the proximal pipe affixed to a bulkhead spacedly disposed within the outer barrel and connected to the inner barrel, the distal pipe including a plurality of second apertures in communication with the first annular longitudinal internal passage, the distal pipe affixed to a first end of the inner barrel and circumscribing a central conduit, the central conduit and the inner barrel defining a second annular longitudinal internal passage; a second end of the inner barrel defining a fluid coolant turning void with the bulkhead; and the aforementioned components defining a fluid coolant flow path within the discharge screw wherein the fluid coolant first flows in the first annular longitudinal internal passage in an indirect heat exchange relationship with the single and double solid flights, is turned around as it flows through the second apertures and into the second annular longitudinal internal passage, and the fluid coolant then turned around again in the fluid coolant turning void and into the central conduit for eventual egress from the discharge screw.

* * * * *

UNITED STATES PATENT AND TRADEMARK OFFICE

CERTIFICATE OF CORRECTION

PATENT NO. : 5,863,197

DATED : Jan. 26, 1999

INVENTOR(S) : William A. Boy, et al

It is certified that error appears in the above-identified patent and that said Letters Patent is hereby corrected as shown below:

IN THE DRAWINGS:

Delete drawing sheet 1 of 3 and substitute therefore the drawing sheet consisting of Fig. 1, as shown on the attached page.

Signed and Sealed this

Tenth Day of August, 1999

*Attest:*

Q. TODD DICKINSON

*Attesting Officer*

*Acting Commissioner of Patents and Trademarks*